(12) United States Patent
Rosemeier

(10) Patent No.: US 8,414,447 B2
(45) Date of Patent: Apr. 9, 2013

(54) TRANSMISSION OF A POWER TRAIN FOR DISTRIBUTION OF THE DRIVE TORQUE BETWEEN TWO OUTPUT SHAFTS

(75) Inventor: Thomas Rosemeier, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/334,144

(22) Filed: Dec. 22, 2011

(65) Prior Publication Data
US 2012/0196716 A1    Aug. 2, 2012

(30) Foreign Application Priority Data
Jan. 27, 2011    (DE) .................... 10 2011 003 264

(51) Int. Cl.
*F16H 3/44*    (2006.01)
(52) U.S. Cl. .................. 475/282; 475/279; 475/330
(58) Field of Classification Search .......... 475/269, 475/275, 277, 279, 282, 288, 296, 329, 330
See application file for complete search history.

(56) References Cited

U.S. PATENT DOCUMENTS

| | | | |
|---|---|---|---|
| 7,211,021 B2 * | 5/2007 | Gumpoltsberger | 475/275 |
| 7,238,132 B2 * | 7/2007 | Sowul et al. | 475/5 |
| 7,479,088 B2 | 1/2009 | Baasch et al. | |
| 8,282,524 B2 * | 10/2012 | Bock et al. | 475/205 |
| 2002/0166676 A1 | 11/2002 | Andriani | |
| 2004/0220011 A1 | 11/2004 | Gumpoltsberger et al. | |
| 2004/0226760 A1 | 11/2004 | Loh et al. | |
| 2007/0015618 A1 | 1/2007 | Baasch et al. | |
| 2007/0087885 A1 | 4/2007 | Rosemeier et al. | |
| 2007/0087886 A1 | 4/2007 | Rosemeier et al. | |
| 2010/0130323 A1 * | 5/2010 | Gumpoltsberger | 475/59 |

FOREIGN PATENT DOCUMENTS

| | | |
|---|---|---|
| DE | 103 19 684 A1 | 12/2004 |
| DE | 602 01 453 T2 | 1/2005 |
| DE | 103 48 959 A1 | 5/2005 |
| DE | 103 48 960 A1 | 5/2005 |
| DE | 10 2005 049 707 A1 | 4/2007 |
| DE | 10 2005 049 709 A1 | 4/2007 |
| DE | 10 2006 022 175 A1 | 11/2007 |
| EP | 0 493 206 A1 | 7/1992 |
| JP | 2009 156 344 A | 7/2009 |
| WO | 2004/101344 A2 | 11/2004 |

* cited by examiner

*Primary Examiner* — Justin Holmes
(74) *Attorney, Agent, or Firm* — Davis & Bujold, PLLC

(57) ABSTRACT

A transmission device for distributing drive torque between two output shafts. The device comprises three planetary gearsets (2, 3, 11). An input shaft is connected to a first element of gearsets (2, 3). The output shafts each couple a second element of gearsets (2, 3). A third element of gearset (2) couples a first element of gearset (11) and is connectable, via brake (14), to the housing. A third element of gearset (3) is connectable, via brake (17), to the housing and, via a claw shifting element (24), to a second element of gearset (11). A third element of gearset (11) couples the housing. Claw shifting elements (24, 18) couple the brakes (14, 17) such that, to engage brakes (14, 17), the claw shifting elements are first coupled to the first element of gearset (11) or the third element of gearset (3), and then the brakes are engaged.

7 Claims, 1 Drawing Sheet

TRANSMISSION OF A POWER TRAIN FOR DISTRIBUTION OF THE DRIVE TORQUE BETWEEN TWO OUTPUT SHAFTS

This application claims priority from German patent application serial no. 10 2011 003 264.9 filed Jan. 27, 2011.

FIELD OF THE INVENTION

The invention concerns a transmission device of a power train for distributing the drive torque between two output shafts.

BACKGROUND OF THE INVENTION

From the prior art it is known to connect, downstream from main transmissions in the power flow of a powertrain, transmission devices or longitudinal transfer transmissions which serve to distribute the torque delivered by at least one drive motor of the vehicle to at least two driven vehicle axles in the longitudinal direction of a vehicle.

In addition it is known to distribute the drive torque delivered to a driven vehicle axle between the two drive wheels of the vehicle axle, whereby the drive wheels of a driven vehicle axle can be driven at different speeds independently of one another in accordance with the different path lengths of the left and right tracks; in this way the drive torque can be distributed to the two drive wheels without producing any yawing moment.

In this situation, due to the compensating action of a differential transmission, the propulsion forces of the two drive wheels of one or more driven vehicle axles that can be transmitted to the road are governed in each case by the lower or lowest drive torque of the two drive wheels or driven axles that can be transmitted, and this has the disadvantageous result that if a drive wheel, for example one that is on glazed frost, undergoes wheel-spin, the torque delivered to the other drive wheel, the one on a gripping surface, cannot be any greater than that delivered to the spinning drive wheel. Accordingly, in such a situation, due to the compensating action of a differential transmission which enables a speed difference to exist between the two output shafts of the differential transmission, the vehicle cannot start moving.

To avoid this, in the prior art it has been proposed that in the event of critical driving conditions the compensating action of differential transmissions should be prevented by appropriate measures, for example by blocking the differential transmission by means of a differential lock.

DE 103 48 959 A1 by the present applicant describes a transmission device for distributing drive torque to at least two output shafts, which comprises at least two planetary gearsets each with at least three shafts, such that in each case a first shaft of a planetary gearset is connected to a drive input shaft and in each case a second shaft of a planetary gearset is one of the output shafts. In this known transmission device it is provided that in each case a third shaft of the planetary gearsets is in active connection with a brake in such manner that a degree of distribution of the drive torque between the two output shafts varies as a function of the transmission capacity of the brakes.

By virtue of the transmission device known from DE 103 48 959 A1 a transmission device should be provided, which is of simple design, inexpensive to produce, and by means of which a degree of drive torque distribution between two output shafts can be varied according to need.

According to DE 103 48 959 A1 it is provided that the third shaft of the planetary gearsets are functionally connected to one another, this functional connection being realized in each case by a brake by means of which, with a correspondingly set transmission capacity, in each case a torque can be supported by a housing of the transmission device and such that the two brakes can be controlled by a separate control unit or by the transmission control unit of the transmission device.

Here, the functional connection of the respective third shaft of the planetary gearsets with one another consists of two mutually parallel power paths, the first power path comprising a third planetary gearset that can be connected into the force flow of the transmission by means of a claw clutch and the second power path consisting of the transmission housing and the two brakes, which are respectively connected to the sun gear of the first planetary gearset and the sun gear of the second planetary gearset, such that in the engaged condition the two sun gears of the planetary gearsets are fixed relative to the housing. When the two brakes are engaged at the same time, the compensating action of the transmission is completely blocked so that the two output shafts rotate at the same speed.

When the claw clutch associated with the third planetary gearset is disengaged, by suitably controlling the two brakes a distribution degree of the drive torque between the two output shafts ranging between 0% and 100% can be achieved, such that to reduce power losses it is preferable for one respective brake to be in the engaged condition while the respective other brake is operated between a fully disengaged condition and a fully engaged condition.

When the brakes are disengaged and at the same time the claw clutch is engaged, the drive torque delivered to the transmission is distributed as a function of a basic distribution of the transmission to the two output shafts, this basic degree of distribution being determined by the ratio of the number of teeth on the ring gear to the number of teeth on the sun gear of the third planetary gearset. As a function of a braking torque applied by one of the brakes, the basic degree of distribution can be changed in a continuously variable manner in the direction of an upper or a lower limit value of the degree of distribution.

Thus, the known axle or distributor transmission can be operated in two modes, such that in the first mode with the claw clutch disengaged, the drive torque is distributed between the two output shafts, whereas in the second mode, with the claw clutch engaged, the effect of a spur gear differential is produced between the two outputs.

Disadvantageously, to operate the transmission device known from DE 103 48 959 A1 a total of three actuating devices are needed, a respective actuating device being associated with each of the two brakes and with the claw clutch. Furthermore, in the differential mode, i.e. with the claw clutch engaged, drag torques are disadvantageously produced by the disengaged brakes.

SUMMARY OF THE INVENTION

The purpose of the present invention, starting from DE 103 48 959 A1 by the present applicant, the entire content of which is also an object of the present description, is to indicate a transmission device of a power train for distributing the drive torque between two output shafts, with which drag losses are reduced during differential operation. Furthermore, to operate the transmission device according to the invention only two actuating devices should be needed.

According to these, a transmission device of a power train for distributing the drive torque between two output shafts is proposed, which comprises a first planetary gearset, a second planetary gearset and a third planetary gearset, such that in each case a first element of the planetary gearsets is connected to a drive input shaft and two shafts, connected respectively to a second element of the first and of the second planetary gearset, from the two output shafts of the transmission device.

In addition, a third element of the first planetary gearset can be coupled on the one hand to a first element of the third planetary gearset and on the other hand, by means of a first brake, to the housing of the transmission device, whereas a third element of the second planetary gearset can be releasably connected, on the one hand, by a second brake to the housing and, on the other hand, by means of a claw shifting element, to a second element of the third planetary gearset, and a third element of the third planetary gearset is coupled by a shaft to the housing. The first and second brakes of the transmission device are in the form of disk brakes.

According to the invention it is provided that in each case a claw shifting element connected upstream from the inner disk carries of the brakes of the transmission device designed as disk brakes, which is also disengaged when the brake is disengaged if no gearshift has been called for, so that when a brake is actuated, first the inner disk carrier concerned is releasably connected, by actuating the claw shifting element upstream from the inner disk carrier, respectively to the torque-transmitting shaft connected to the third element of the first planetary gearset or to the third element of the second planetary gearset, and the brake concerned is then engaged.

Moreover, it is proposed that to actuate the second brake, only one actuator is provided for the claw shifting element upstream from the inner disk carrier of the second brake and for the claw shifting element that releasably connects the third element of the second planetary gearset with a second element of the third planetary gearset; in addition a second actuator can be provided for actuating the first brake and the claw shifting element upstream from the inner disk carrier of the first brake.

Preferably, the first element of the first and of the second planetary gearset is the ring gear, the second element of the first and of the second planetary gearset is the carrier, and the third element of the first and of the second planetary gearset is the sun gear, and the first element of the third planetary gearset is the sun gear, the second element of the third planetary gearset is the ring gear, and the third element of the third planetary gearset is the carrier of the third planetary gearset.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Figure 1:
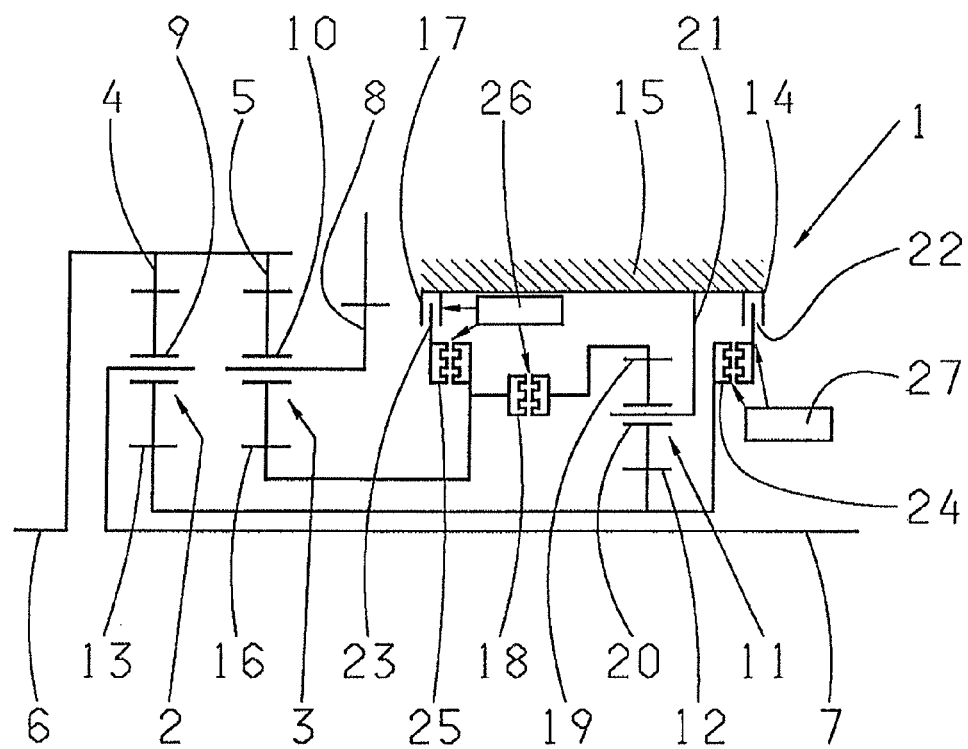
FIG. 1: A schematic view showing part of a transmission device designed according to the invention for distributing the drive torque between two output shafts.

FIG. 1 shows a transmission device 1 designed according to the invention, which can be used in a power train of a motor vehicle between a main transmission and the driven vehicle axles for the longitudinal distribution of drive torque between the driven vehicle axles, or in a driven vehicle axle of a motor vehicle for the transverse distribution of the drive torque between two drive wheels of the vehicle axle.

The transmission device 1 shown comprises a first planetary gearset 2 and a second planetary gearset 3, which can be designed for example as a minus, plus, bevel gear or stepped planetary gearset, wherein in each case an element, namely the ring gear 4, 5 of the planetary gearsets 2, 3 is connected to a drive input shaft 6 which is a transmission output shaft of a main transmission (not shown) of the power train.

In addition, respective shafts 7 or 8 of the planetary gearsets 2, 3 form output shafts of the transmission device 1, which are in active connection either with a respective driven vehicle axle or with a driven wheel of a vehicle axle. The second shafts 7 or 8 of the planetary gearsets 2, 3 are connected on the drive input side to the respective carrier 9, 10 of the planetary gearsets 2, 3 in the example shown.

Furthermore, in the attached figure a third planetary gearset is indexed 11. In this case the sun gear 13 of the first planetary gearset 2 can be coupled on the one hand to the sun gear 12 of the third planetary gearset 11 and on the other hand, by means of a first brake 14, to the housing 15 of the transmission device 1. Moreover, the sun gear 16 of the second planetary gearset 3 can, on the one hand, be coupled by means of a second brake 17 to the housing 15 and, on the other hand, by means of a claw shifting element 18, it can be connected to the ring gear 19 of the third planetary gearset 11; the carrier 20 of the third planetary gearset 11 is coupled to the housing 15 by a shaft 21. The first and second brakes 14, 17 are in the form of disk brakes.

The transmission device 1 shown in FIG. 1 comprises two power paths, the third planetary gearset 11, which can be engaged in the force flow by means of the claw shifting element 18, being integrated in the first power path. In this case, when the shifting element 18 is closed and the brakes 14, 17 are open, the drive torque delivered by the drive input shaft 6 is distributed to the two output shafts 7 and 8 as a function of the ratio of the number of teeth on the ring gear 19 of the third planetary gearset 11 to the number of teeth on the sun gear 12 of the third planetary gearset 11.

This basic degree of distribution of the drive torque can be changed continuously variably, as a function of a braking torque applied by the first brake 14 or the second brake 17 multiplied by the factor of the ratio of the tooth number on the ring gear 4 of the first planetary gearset 2 or on the ring gear 5 of the second planetary gearset 3 to the tooth number of the sun gear 13 of the first planetary gearset 2 or the sun gear 16 of the second planetary gearset 3, in the direction of an upper or lower limit of the degree of distribution, whereby the effect of a differential is achieved.

The second power path of the transmission device 1 shown comprises the housing 15 of the transmission device 1 and the first and second brakes 14, 17, and enables a continuously variable distribution of the drive torque between the two output shafts 7, 8, such that for this purpose, respectively, one of the two brakes 14, 17 is preferably kept in a drag-loss-free engaged condition while the other brake is operated in the disengaged condition, or with slip, or in the engaged condition in order to distribute the drive torque between the two output shafts 7, 8. When the brakes 14, 17 are both engaged at the same time, the two output shafts 7, 8 are driven at the same speed.

According to the invention it is proposed that in each case a respective claw shifting element 24, 25 is connected upstream from the inner disk carriers 22, 23 of the brakes 14, 17 made as disk brakes, these also being disengaged when the brake concerned is disengaged, such that when the first or second brake 14, 17 is actuated, first the inner disk carrier 22 or 23 concerned is releasably connected to the torque-transmitting shaft connected respectively to the sun gear 13 of the first planetary gearset 2 or to the sun gear 16 of the second planetary gearset 3 by actuating the claw shifting element 24 or 25 upstream from the inner disk carrier 22 or 23, and the brake concerned is then engaged.

Thanks to the complete decoupling of the brakes from the torque-transmitting shafts that can be achieved in this manner, when no shift process has been called for, the drag losses occurring when a disk brake is disengaged are advantageously avoided, so that particularly in the differential mode of the transmission device 1 according to the invention, drag losses are significantly reduced.

In addition it is proposed according to the invention to actuate the second brake 17, the claw shifting element 25 upstream from the inner disk carrier 22 of the second brake 17 and the claw shifting element 18 that releasably connects the ring gear 19 of the third planetary gearset 11 to the sun gear 16 of the second planetary gearset 3, solely by means of a first actuator, the second brake 17 and the two claw shifting elements 18, 25 being arranged for this purpose in such manner as to enable actuation by means of only one actuator. In the attached FIG. 1 this common first actuator is indexed 26 and the arrows indicate how the first actuator 26 is associated with the shifting elements 17, 18 and 25.

According to the invention, the displacement path of the first actuator 26 covers four positions which occur in the following sequence: position for engaging the claw shifting element 18, which releasably connects the ring gear 19 of the third planetary gearset 11 to the sun gear 16 of the second planetary gearset 3, then the neutral position, then the position for engaging the claw shifting element 25 upstream from the inner disk carrier of the second brake 17, and finally the position for engaging the second brake 17 when the claw shifting element 25 is engaged.

Figure 2:
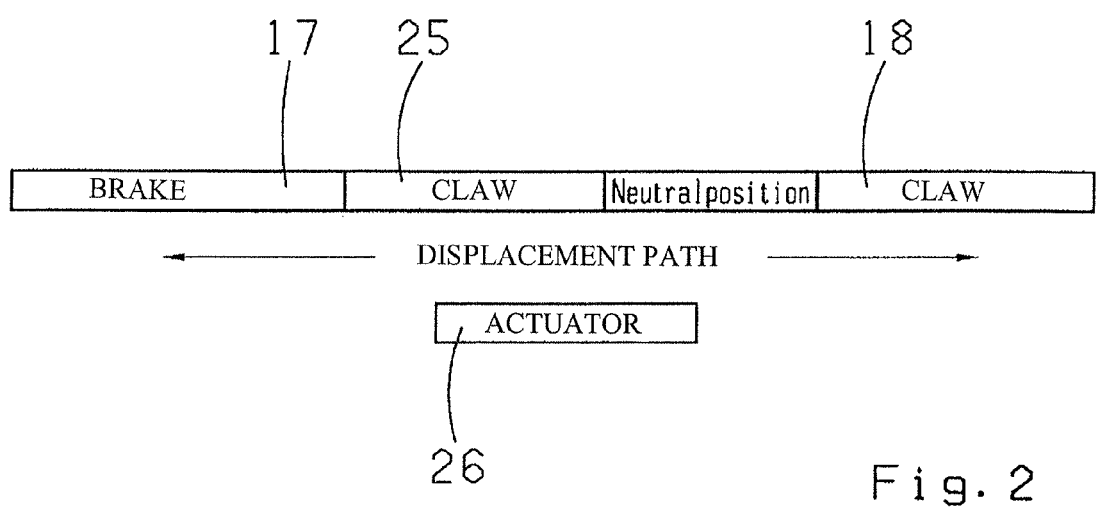
FIG. 2: A schematic representation showing the displacement path of the common actuator of the second brake, the claw shifting element upstream from the inner disk carrier of the second brake and the claw shifting element that releasably connects the ring gear of the third planetary gearset to the sun gear of the second planetary gearset.

In this case the second brake 17 can be operated with a defined amount of slip as a function of the exact position of the first actuator 26. A schematic representation of the displacement path of the first actuator 26 is shown in the attached FIG. 2.

Accordingly, in the differential mode, in which the claw shifting element 18 is engaged, the degree of distribution of the torque to the output shafts 7, 8 is varied by controlling the first brake 14, since when the claw shifting element 18 is engaged the second brake 17 is disengaged.

Moreover, in a further development of the invention it is proposed to actuate the first brake 14 and the claw shifting element 24 upstream from the inner disk carrier 22 by means of a second actuator, which is indexed 27 in FIG. 1.

According to the invention the displacement path of the second actuator 27 covers three positions which occur in the sequence: neutral position, then the position for engaging the claw shifting element 24 upstream from the inner disk carrier 22 of the first brake 14, and finally the position for engaging the first brake 14 when the claw shifting element 24 is engaged, such that the first brake 14 can be operated with a defined amount of slip as a function of the exact position of the second actuator 27.

By virtue of the concept according to the invention, the second brake 17, the claw shifting element 25 upstream from the inner disk carrier of the second brake 17 and the claw shifting element 18 can be actuated by only one actuator, namely the first actuator 26, and the first brake 14 and the claw shifting element 24 upstream from the first brake 14 can be actuated by one actuator, namely the second actuator 27, so that compared with the prior art there is no need for another actuator, for example comprising an electric motor and a ball spindle. This reduces the production and assembly costs as well as the weight, and at the same time makes fitting space available for other components of the transmission device.

Furthermore, in that a respective claw shifting element 24, 25 is located upstream from the inner disk carriers 22, 23 of the brakes 14 and 17 made as disk brakes, the drag losses resulting from the fact that the brakes 14, 17 are disk brakes are largely reduced, without impairing the functionality of the transmission device.

INDEXES

1 Transmission device
2 First planetary gearset
3 Second planetary gearset
4 Ring gear of the first planetary gearset 2
5 Ring gear of the second planetary gearset 3
6 Drive input shaft
7 Output shaft
8 Output shaft
9 Carrier of the first planetary gearset 2
10 Carrier of the second planetary gearset 3
11 Third planetary gearset
12 Sun gear of the third planetary gearset 11
13 Sun gear of the first planetary gearset 2
14 First brake
15 Housing of the transmission device 1
16 Sun gear of the second planetary gearset 3
17 Second brake
18 Claw shifting element
19 Ring gear of the third planetary gearset 11
20 Carrier of the third planetary gearset 11
21 Shaft
22 Inner disk carrier of the first brake 14
23 Inner disk carrier of the second brake 17
24 Claw shifting element
25 Claw shifting element
26 First actuator
27 Second actuator

The invention claimed is:
1. A transmission device of a power train for distributing drive torque between first and second output shafts (7, 8), the transmission device comprising:
   a first planetary gearset (2),
   a second planetary gearset (3),
   a third planetary gearset (11), and
   a respective first element (4, 5) of the first and the second planetary gearsets (2, 3) being connected to a drive input shaft (6),
   wherein the first and the second output shafts (7, 8) being respectively connected to a second element (9, 10) of the first and the second planetary gearsets (2, 3) to form the first and the second output shafts of the transmission device (1),
   a third element (13) of the first planetary gearset (2) is connected, on one hand, to a first element (12) of the third planetary gearset (11) and is connectable, on the other hand, to a housing (15) of the transmission device (1) by a first brake (14),
   a third element (16) of the second planetary gearset (3) is connectable, on one hand, by a second brake (17) to the housing (15) and, on the other hand, is connectable by a first claw shifting element (18) to a second element (19) of the third planetary gearset (11),
   a third element (20) of the third planetary gearset (11) is coupled by a shaft (21) to the housing (15), a second claw shifting element (24) is connected upstream from an inner disk carrier (22) of the first brake (14) made as a disk brake, and second claw shifting element (24) is disengaged when the first brake (14) is disengaged, a third claw shifting element (25) is connected upstream from an inner disk carrier (23) of the second brake (17) made as a disk brake, and the third claw shifting element (25) is disengaged when the second brake (17) is disengaged, when the first brake (14) is to be actuated, the inner disk carrier (22) of the first brake (14) is first releasably connected to a torque-transmitting shaft connected to the third element (13) of the first planetary gearset (2) by actuating the second claw shifting element (24), located upstream from the inner disk carrier (22, 23) of the first brake (14), and then the first brake (14) is engaged, when the second brake (17) is to be actuated, the inner disk carrier (23) of the second brake (17) is first releasably connected to a torque-transmitting shaft connected to the third element (16) of the second planetary gearset (3) by actuating the third claw shifting element (25), located upstream from the inner disk carrier (23) of the second brake (17), and then the second brake (17) is engaged, and a first actuator (26) being provided for actuating the second brake (17), the third claw shifting element (25) upstream from the inner disk carrier (23) of the second brake (17) and the first claw shifting element (18).

2. The transmission device of the power train for distributing the drive torque between the first and the second output shafts (7, 8) according to claim 1, wherein a displacement path of the first actuator (26) covers four positions which occur in a following sequence:
   a position for engaging the first claw shifting element (18),
   a neutral position,
   a position for engaging the third claw shifting element (25) located upstream from the inner disk carrier (23) of the second brake (17), and
   a position for engaging the second brake (17) once the third claw shifting element (25) is engaged.

3. The transmission device of the power train for distributing the drive torque between the first and the second output shafts (7, 8) according to claim 1, wherein a second actuator (27) is provided for actuating the first brake (14) and the second claw shifting element (24) located upstream from the inner disk carrier (22) of the first brake (14), whose displacement path covers three positions which occur in a sequence of:
   a neutral position,
   a position for engaging the second claw shifting element (24) located upstream from the inner disk carrier (22) of the first brake (14), and
   a position for engaging the first brake (14) once the second claw shifting element (24) is engaged.

4. The transmission device of the power train for distributing the drive torque between the first and the second output shafts (7, 8) according to claim 1, wherein the first element (4, 5) of the first and the second planetary gearsets (2, 3) is a ring gear, the second element (9, 10) of the first and the second planetary gearsets (2, 3) is a carrier and the third element of the first and the second planetary gearsets (2, 3) is a sun gear, and
   the first element (12) of the third planetary gearset (11) is a sun gear, the second element (19) of the third planetary gearset (11) is a ring gear, and the third element (20) of the third planetary gearset (11) is a carrier.

5. The transmission device of the power train for distributing the drive torque between the first and the second output shafts (7, 8) according to claim 1, wherein, when the first claw shifting element (18) is engaged and the first and the second brakes (14, 17) are disengaged, the drive torque delivered by the drive input shaft (6) is distributed as a function of a basic degree of distribution of the drive torque to the first and the second output shafts (7, 8) such that the basic degree of distribution is continuously variable, as a function of control of the first brake (14), in a direction of either an upper or a lower limit value of the degree of distribution.

6. The transmission device of the power train for distributing the drive torque between the first and the second output shafts (7, 8) according to claim 1, wherein, when the first claw shifting element (18) is disengaged, the distribution of the drive torque between the first and the second output shafts (7, 8) is continuously variable, and, for this purpose, in each case one of the first and the second brakes (14, 17) is kept in a loss-free engaged condition, while to distribute the drive torque between the first and the second output shafts (7, 8), the other brake is either operated in the disengaged condition, or with slip, or in the engaged condition, whereas if both the first and the second brakes (14, 17) are engaged at the same time, the first and the second output shafts (7, 8) are driven at the same rotational speed.

7. A transmission device of a power train for distributing drive torque between first and second output shafts (7, 8), the transmission device comprising:
   first, second, and third planetary gearsets (2, 3, 11), each of the first, the second and the third planetary gearsets (2, 3, 11) comprising a first element (4, 5, 12), a second element (9, 10, 19) and a third element (13, 16, 20);
   a drive input shaft (6) being connected to the first element (4, 5) of the first and the second planetary gearsets (2, 3);
   the first output shaft (7) being connected to the second element (9) of the first planetary gearset (2) and the second output shaft (8) being connected to the second element (10) of the second planetary gearset (3);
   the third element (13) of the first planetary gearset (2) being connected to the first element (12) of the third planetary gearset (11) and being connectable, via a first brake (14), to a housing (15) of the transmission device (1);
   the third element (16) of the second planetary gearset (3) being connectable, via a second brake (17), to the housing (15) of the transmission device (1) and being connectable, via a first claw shifting element (18), to the second element (19) of the third planetary gearset (11);
   the third element (20) of the third planetary gearset (11) being connected, via a further shaft (21), to the housing (15) of the transmission device (1);
   a second claw shifting element (24) being connected upstream from an inner disk carrier (22) of the first brake (14), and a first actuator (27) actuating the second claw shifting element (24) and the first brake (14) such that the second claw shifting element (24) being disengaged, when the first brake (14) is disengaged, and when the first brake (14) is to be actuated, the second claw shifting element (24) being actuated to releasably connect the inner disk carrier (22) of the first brake (14) to a torque-transmitting shaft connected to the third element (13) of the first planetary gearset (2), and subsequently the first brake (14) is engaged;
   a third claw shifting element (25) being connected upstream from an inner disk carrier (23) of the second brake (17), and a second actuator (26) actuating the second brake (17), the third claw shifting element (25) and the first claw shifting element (18) such that the third claw shifting element (25) being disengaged, when the second brake (17) is disengaged, and when the second brake (17) is to be actuated, the third claw shifting element (25) being actuated to releasably connect the inner disk carrier (23) of the second brake (17) to the third element (16) of the second planetary gearset (3), and subsequently the second brake (17) is then engaged.

* * * * *